United States Patent [19]

Badsey

[11] 4,448,278
[45] May 15, 1984

[54] LAND VEHICLE

[76] Inventor: William J. Badsey, P.O. Box 70061, Bryanston 2021, South Africa

[21] Appl. No.: 348,682

[22] Filed: Feb. 16, 1982

[30] Foreign Application Priority Data

Feb. 20, 1981 [ZA] South Africa ........................ 81/1127

[51] Int. Cl.³ ............................................. B62D 61/06
[52] U.S. Cl. .................................... 180/210; 180/291; 296/15; 296/64
[58] Field of Search ...................... 180/210, 215, 54 A, 180/291, 7 J; 296/64, 1 S

[56] References Cited

U.S. PATENT DOCUMENTS

| 2,574,199 | 11/1951 | Tandler et al. | 180/210 |
| 2,612,964 | 10/1952 | Hobbs | 296/64 X |
| 2,788,858 | 4/1957 | Aasland et al. | 180/210 |

FOREIGN PATENT DOCUMENTS

502083 11/1954 Italy ..................................... 180/210

Primary Examiner—John A. Pekar
Attorney, Agent, or Firm—Fred Wiviott

[57] ABSTRACT

A land vehicle which comprises three wheel locations, two near the front of the vehicle and spaced apart and the third at rear of the vehicle and centrally located, an engine unit located centrally and within the wheelbase of the vehicle, and two passenger compartments located one on either side of the engine unit.

10 Claims, 12 Drawing Figures

LAND VEHICLE

BACKGROUND OF THE INVENTION

1. Field of the Invention

This invention concerns improvements in and relating to land vehicles, more particularly motor driven land vehicles.

2. Description of the Prior Art

Motorcycles (two-wheelers) have existed since the very early development of motorised land vehicles and in post war years have seen a very substantial development in terms of the mechanical sophistication and power output of the engines used. In particular specific power outputs (power to weight ratios) have become very high to an extent that any further power increase is hardly tenable for a two wheeler for road use.

By contrast conventional (four wheeler) motor cars have comparatively poor power to weight ratios which cause poor economy and poor performance by comparison with motorcycles.

There is no significant production today of three wheelers which are regarded as unsafe due to poor stability, anachronistic "motorised tricycles" or otherwise having a poor image.

SUMMARY OF THE INVENTION

A land vehicle in accordance with this invention comprises three wheel locations, two near the front of the vehicle and spaced apart and the third at rear of the vehicle and centrally located, so defining a wheelbase of the vehicle, an engine unit located centrally and within the wheelbase of the vehicle, and two passenger compartments at least in part located one on either side of the engine unit.

An engine unit means at least an engine with a transmission output but also an engine with gearbox unit.

The wheel location can be filled by either one or more wheels at each location. A common arrangement will be a single wheel at each location but for example a pair of wheels particularly at the location of the rear wheel may be an acceptable alternative.

The reference to "centrally located" means located on or near a fore and aft centre line of the vehicle or axis of bi-lateral symmerty of the vehicle. The wheel base of the vehicle is the area located between the front wheel locations and the rear wheel location.

The two passenger compartments may have a space communicating between them. An additional passenger compartment or compartments may be feasible in a suitable size of vehicle, within the scope of this invention.

Preferably the vehicle comprises centrally located air flow channeling structure extending from an entrance near the front of the vehicle to the engine and with an exit or exits behind the engine.

The passenger compartments may thus be located consequently on either side of the centrally located air flow channeling and the engine and transmission unit.

In accordance with a preferred feature of the invention the air flow channeling structure extends as a single passage from the entrance to the engine, as two passages from behind the engine, an upper passage and a lower passage, with a vehicle streamline re-entrance ramp surface extending from behind the engine upwardly towards the rear of the vehicle.

The engine location is an important characteristic of the invention and preferably the engine is located closer to the front wheel locations than the rear wheel location.

A preferred embodiment of the invention has rear wheel drive, comprising a transmission train from the engine unit to a rear wheel or wheels at the rear wheel location. Front wheel drive is another option within the scope of the invention.

In the case where a single rear wheel is used a preferred feature which is also of importance for good stability and road holding characteristics of the vehicle is that the single rear wheel has a wider tread, (and preferably larger diameter), than the tread (and diameter) of each of the front wheels so that the footprint area of the rear wheel is no more than 20% smaller than, and preferably no more than 20% larger than, the total of the footprint areas of both front wheels.

In accordance with a preferred embodiment of the invention the engine unit is mounted on a sub frame which is slidable into the vehicle from rear. Preferably the vehicle has a chassis and the subframe is slidable onto the chassis and may be removably attached to the chassis and the transmission train from the engine unit to a rear wheel or wheels at the rear wheel location is also mounted on the subframe. Where a rear wheel or wheels is/are mounted on swing arms these are preferably pivotally mounted also on the subframe.

The preferred embodiment of the invention employs an engine unit in the form of a motorcycle engine and gearbox unit. A shaft, chain or belt drive transmission train is employed to transmit the drive preferably to the rear wheel(s).

BRIEF DESCRIPTION OF THE DRAWINGS

This invention will now be more fully described by way of an example with reference to the accompanying drawings, in which.

DESCRIPTION OF THE PREFERRED EMBODIMENT

As shown in the drawings the vehicle comprises three wheel locations 1,2 and 3, the two locations 1 and 2 being near the front 4 of the vehicle and spaced apart and the third at the rear 5 of the vehicle and centrally located, an engine unit 6 located centrally and within the wheel base which is the area between the axis 7 of the front wheels and the axis 8 of the rear wheel and two passenger compartments 9 and 10 which are located one on either side of the engine unit 6. The vehicle further has a centrally located air flow channeling structure extending from front of the vehicle to the rear of the vehicle, and comprising a louvred front entrance 11, a ducting volume 50 formed by surrounding bodywork 50a, 50b, extending from this entrance to the engine 6 and having a streamline re-entrance ramp surface, 12a which divides exits for the air flow from behind the engine into two exits, one for flow of the air above the ramp surface 12 and the other for flow of the air below it and past the rear wheel cockpit front walls 24a and sidewalls 24b further define the ducting volume. Ramp surface 12 extends upwardly towards the rear of the vehicle. The engine 6 is located somewhat closer to the axis 7 of the front wheels than to the axis 8 of the rear wheel.

Figure 1:
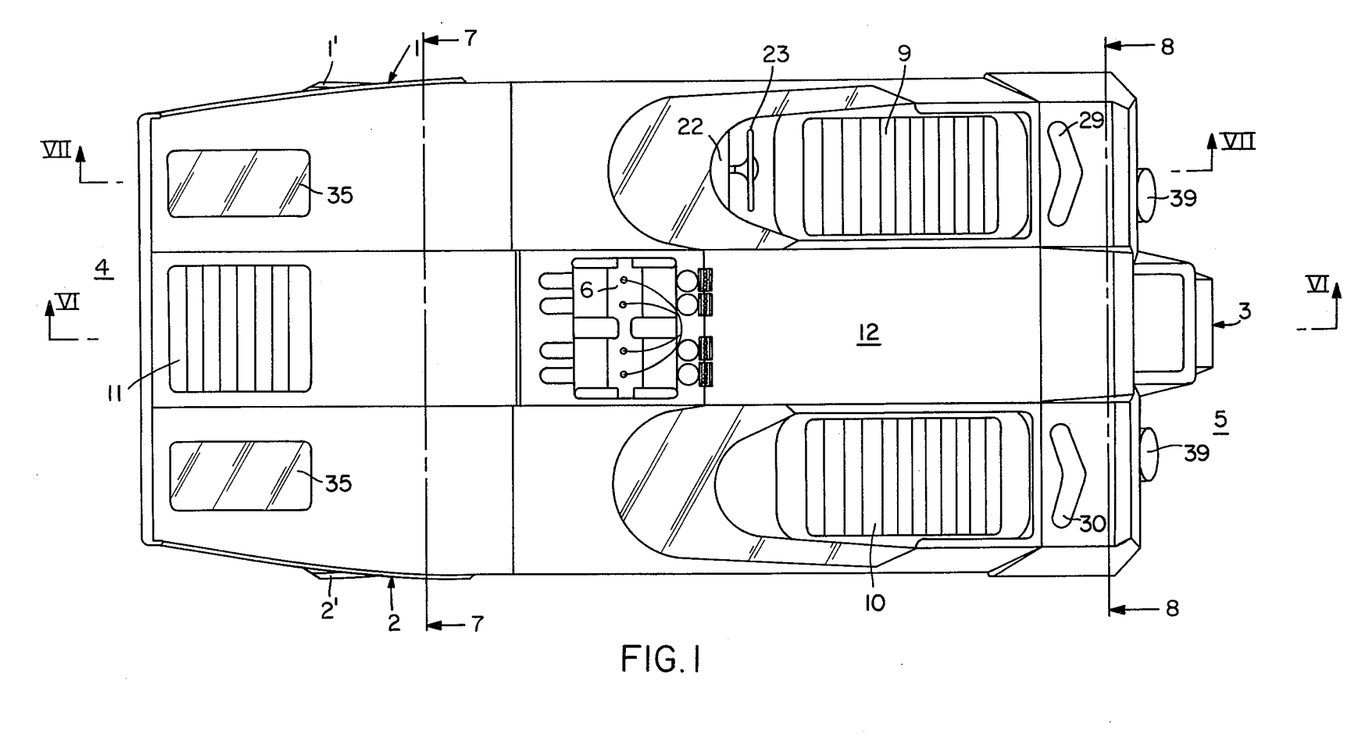
FIG. 1 is a plan view of the vehicle.
Figure 2:
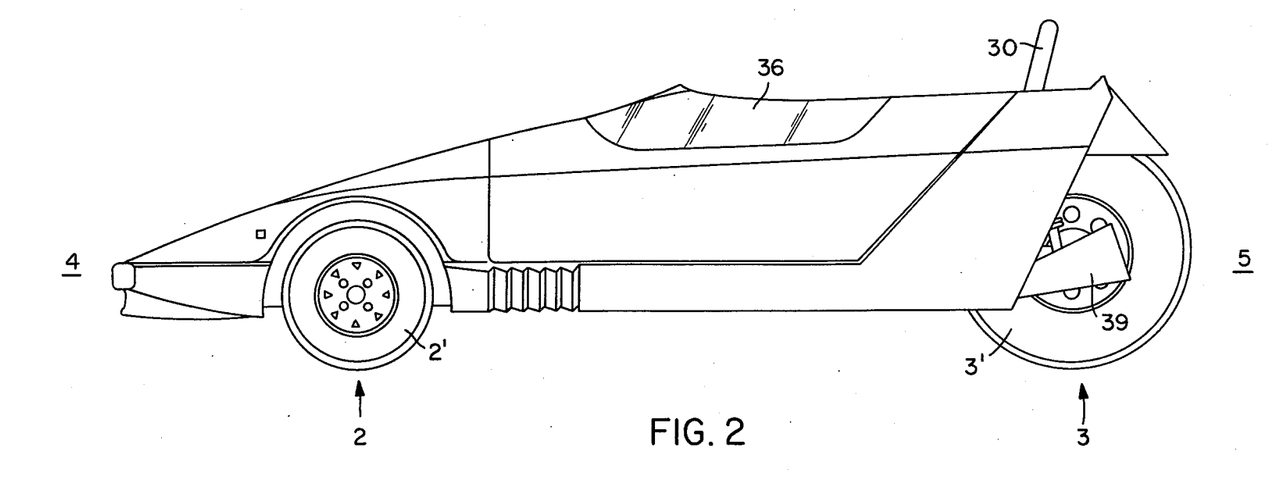
FIG. 2 is a side elevation of the vehicle.
Figure 3:
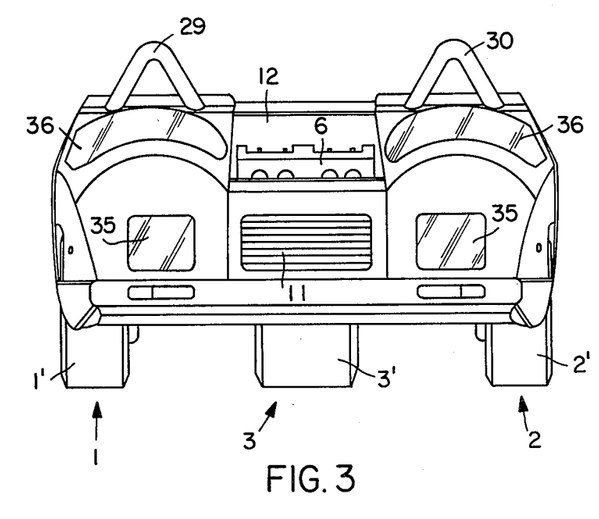
FIG. 3 is a front elevation of the vehicle.
Figure 4:
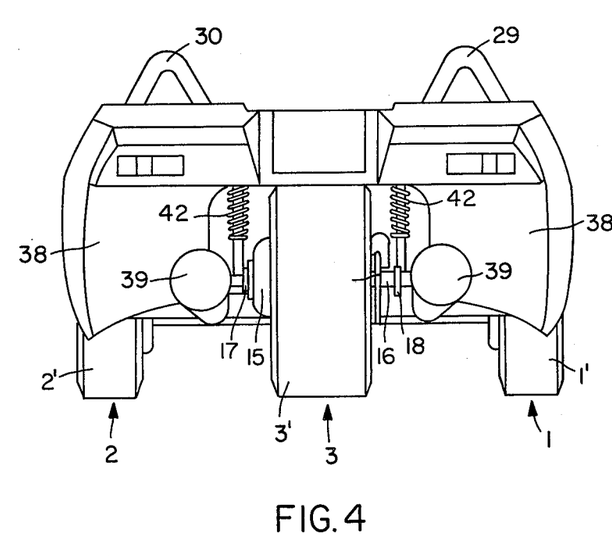
FIG. 4 is a rear elevation of the vehicle.
Figure 5:
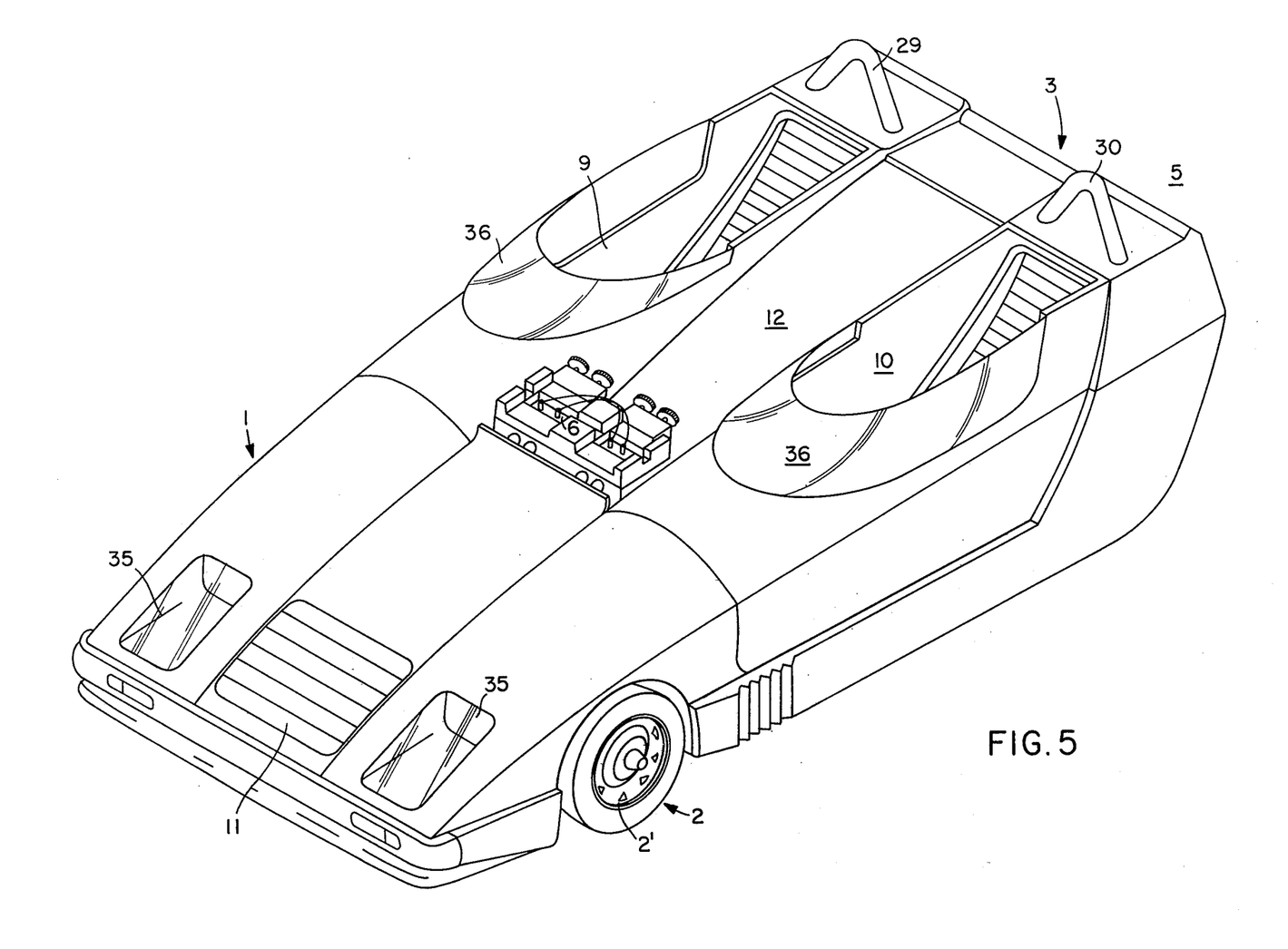
FIG. 5 is an isometric view of the vehicle.
Figure 6:
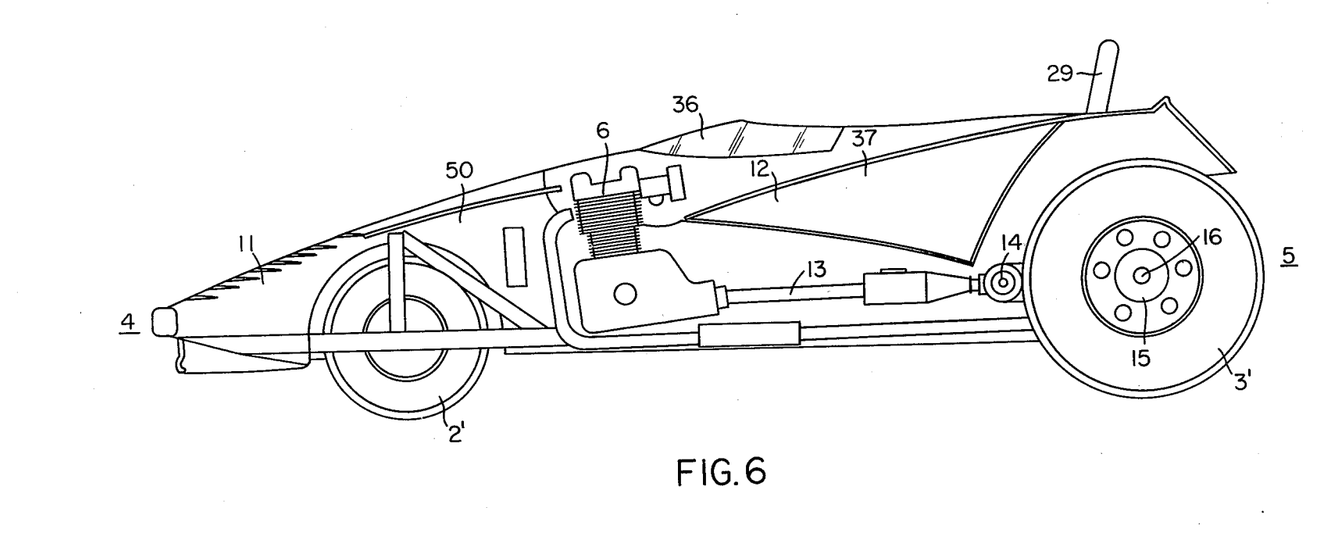
FIG. 6 is a cross sectional side elevation on section VI—VI shown in FIG. 1.
Figure 7:
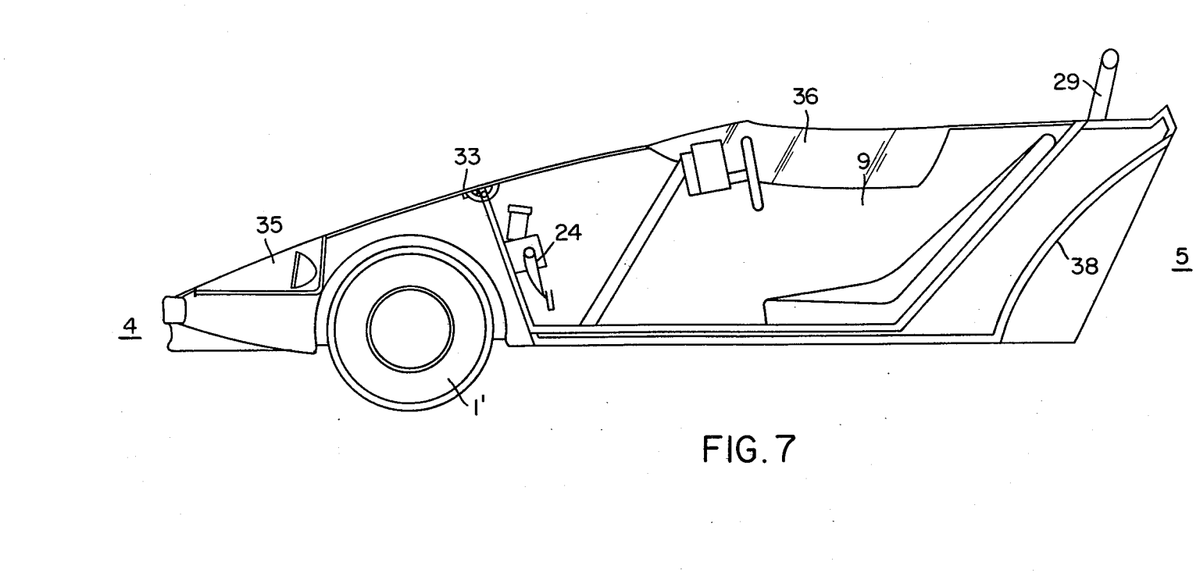
FIG. 7 is a cross sectional side elevation of section VII—VII shown in FIG. 1.
Figure 8:
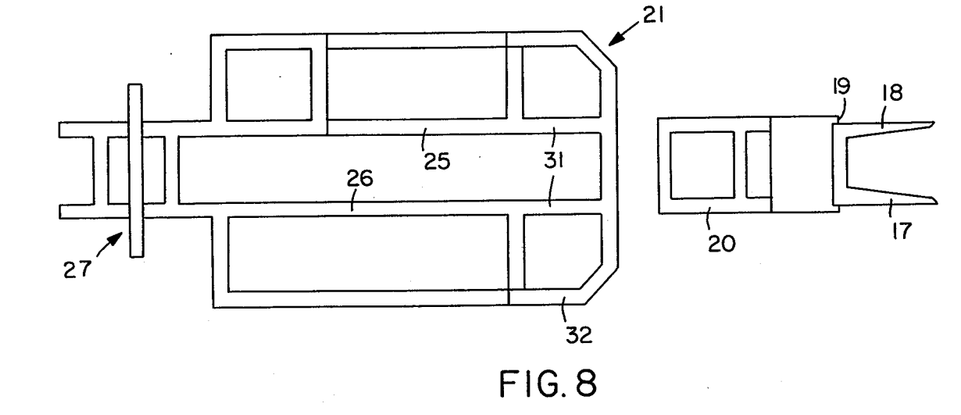
FIG. 8 is a plan view of the chassis and subframe of the vehicle shown separated.
Figure 9:
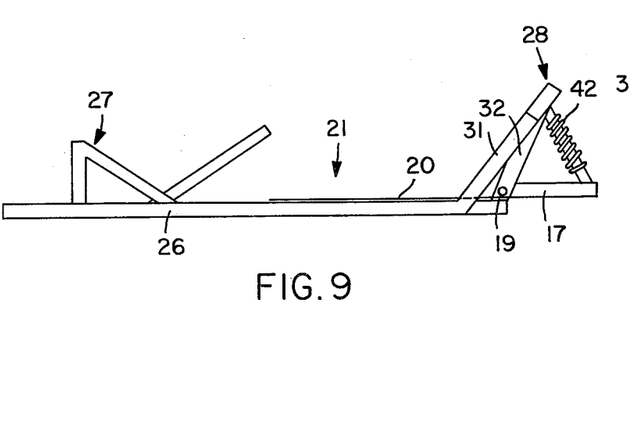
FIG. 9 is a side elevation of the chassis and subframe shown assembled.
Figure 10:
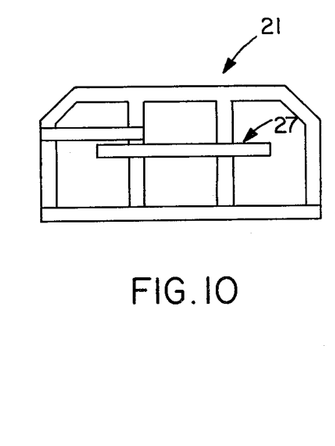
FIG. 10 is a front elevation of the chassis.
Figure 11:
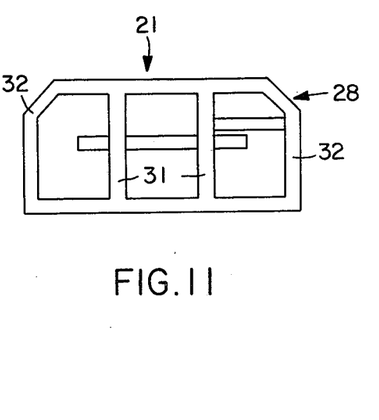
FIG. 11 is a rear elevation of the chassis.
Figure 12:
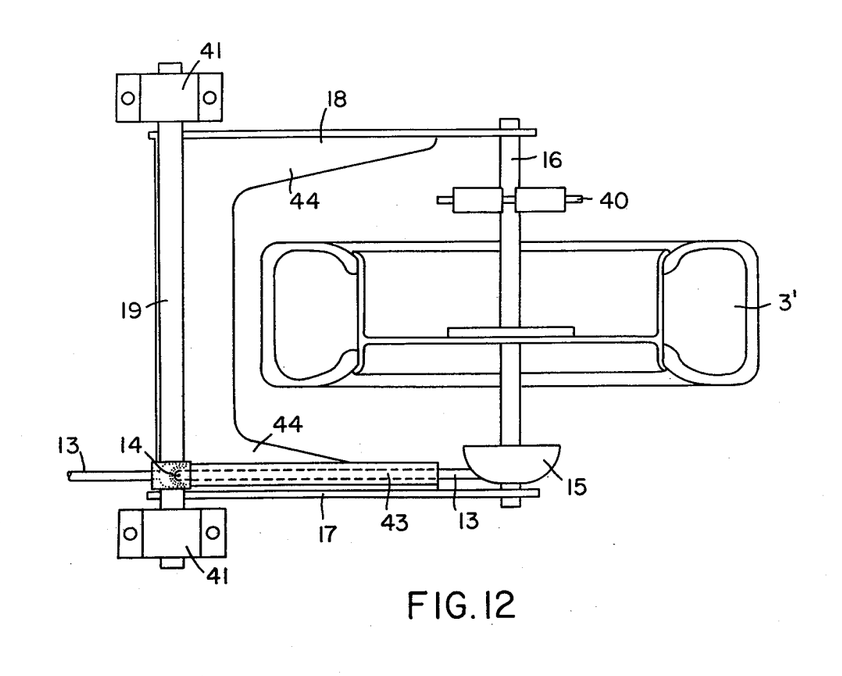
FIG. 12 is a plan view showing a detail of the rear wheel suspension.

The vehicle is a rear wheel drive vehicle the engine unit 6 including engine and gearbox and the transmission train including a shaft drive 13 extending from the engine rearwardly via a gearbox 34, a universal joint at 14 to a crown wheel and pinion drive 15 mounted on the rear axle 16 upon which the rear wheel 3' is mounted. Gearbox 34 gives reverse gear and high ratio and low ratio forward gears. In this example each of the wheel locations 1, 2 and 3 comprises only a single wheel, the front wheels 1' and 2' and the rear wheel 3' broken line 3a indicates that the rear wheel 3' could be made up of two contiguous wheels. A distinctive feature of this design is that the rear wheel 3' has a much wider tread and a larger diameter than that of the front wheels 1' and 2' and accordingly a footprint area on the road in use which is substantially the same as the total of the footprint areas of the two front wheels 1' and 2'. The rear wheel 3' is also of somewhat larger diameter than the front wheels to give enhanced roadability characteristics. The rear axle 16 is mounted on two swing arms 17 and 18 which in turn swing on a shaft 19. The shaft 19 is journalled 41 on a subframe 20 which in turn is bolted onto the main chassis 21 of the vehicle. The subframe 20 also carries the engine and transmission train. A disc brake 40 is mounted on the shaft 16 on the right hand side of the rear wheel 3'. Springs 42 act on swing arms 17 and 18. Tube 43 is interposed in bracing 44 of the swing arms to locate shaft 13. A fabricated tubular unit substituting for tube 43, bracing 44 and arms 17 and 18 can be used.

The front wheels 1' and 2' also have hydraulically operated brakes in accordance with conventional technology. Underneath the ramp surface 12 a parcel shelf 37 or analagous space is available for communication between the two cockpits 9 and 10. Cockpit 9 has instrument console 22 and steering wheel 23 and footpedal controls 24, mounted on cockpit end wall 24a.

The tubular frame chassis 21 comprises two main longitudinal members 25 and 26 structure at 27 for holdng the front wheel suspension, which is bolted-on as a suspension unit with castor, camber and toe-inadjusted, and structure 28 for carrying the roll protector bars 29 and 30 and supporting bodywork structure behind the cockpits. In view of the mounting of the entire engine unit and transmission train on the subframe 20 as well as swing arms at rear wheel the entire mechanical drive components of the vehicle and rear wheel can be removed by unbolting the subframe 20 from the chassis and sliding it backwards out of the vehicle. The structure 28 has a distinctive characteristic in that the bars 31 have a different inclination to the bars 32 so that together they constitute a triangulation effect providing fore and aft stiffness to the structure 28.

The upper part of the bodywork of each cockpit is hinged at 33 and a handle may be disconnected so as to lift up this part of the bodywork so as to get into the vehicle or get out of it. Gas springs are used so that it is easily lifted. Headlamps 35 are set into the streamline profile of the vehicle.

In this example the windscreens 36 leave the upper part of each cockpit open but alternatively a closed cockpit or bubble can be provided or even a conventional type roof over the vehicle. The space 37 provides communication between the cockpits. The rear of the vehicle has scooped out formations in the rear wall of the bodywork 38 which provide an aerodynamically induced downward force on the vehicle, the general wedge shape providing a similar force for the front wheels traction. The exhausts 39 extend from the engine rearwardly as shown and the underneath of the body is fully panelled over for squish effect under the vehicle.

I claim:

1. A land vehicle having three wheel means, two of said wheel means being disposed adjacent the front of said vehicle and spaced apart from each other, said third wheel means being disposed adjacent the rear of said vehicle and located centrally thereof, said wheel means defining a wheel base for said vehicle, an engine unit mounted on said vehicle and located centrally thereof and within the wheel base, said vehicle including two passenger compartments, one of said passenger compartments being disposed on either side of the engine unit.

2. A land vehicle as claimed in claim 1, which comprises centrally located air flow channeling structure extending from an entrance near the front of the vehicle to the engine and with an exit or exits behind the engine.

3. A land vehicle as claimed in claim 2, in which the air flow channeling structure extends as a single passage from the entrance to the engine as two passages from behind the engine, an upper passage and a lower passage, and has a vehicle streamline re-entrance ramp surface extending from behind the engine upwardly towards the rear of the vehicle.

4. A land vehicle as claimed in claim 1, which comprises a single rear wheel which has a wider tread than the tread of each of the front wheels so that the footprint area of the rear wheel is no more than 20% larger or smaller than the total of the footprint areas of both front wheels.

5. A land vehicle as claimed in claim 4, in which the rear wheel(s) is/are mounted on swing arms which are pivotally mounted on a subframe which also carries the engine and transmission and is bolted to a main vehicle chassis.

6. A land vehicle as claimed in claim 5, in which the engine is located closer to the front wheel locations than the rear wheel location.

7. The land vehicle as claimed in claim 4 wherein the diameter of said rear wheel means is greater than that of each of said front wheel means.

8. A land vehicle as claimed in claim 1 in which the engine is located closer to the front wheel locations than the rear wheel location.

9. The land vehicle is claimed in claim 1 in which includes a centrally located air flow channeling structure extends as a single passage from an entrance near the front of the vehicle to the engine and with an exit or exits disposed behind the engine, said wheel means comprises a single rear wheel having a wider tread than the tread of each of the front wheels so that the footprint area of the rear wheel is no more that 20% larger or smaller than the total of the footprint areas of both front wheels.

10. The land vehicle set forth in claim 9 wherein the air flow exit comprises an upper passage and a lower passage, and the vehicle streamlined re-entrance ramp surface extending from behind the engine upwardly towards the rear of the vehicle.

* * * * *